United States Patent
Manzoor (10) Patent No.: US 10,422,409 B2
(45) Date of Patent: Sep. 24, 2019

(54) RADIAL VIBRATION DAMPERS HAVING A TUNING RATIO AND A TUNING ANGLE

(71) Applicant: Dayco IP Holdings, LLC, Troy, MI (US)

(72) Inventor: Suhale Manzoor, Plymouth, MI (US)

(73) Assignee: Dayco IP Holdings, LLC, Troy, MI (US)

(*) Notice: Subject to any disclaimer, the term of this patent is extended or adjusted under 35 U.S.C. 154(b) by 0 days.

(21) Appl. No.: 15/671,195

(22) Filed: Aug. 8, 2017

(65) Prior Publication Data

US 2018/0045271 A1 Feb. 15, 2018

Related U.S. Application Data

(60) Provisional application No. 62/373,074, filed on Aug. 10, 2016.

(51) Int. Cl.
  *F16F 15/14* (2006.01)
  *F16F 7/104* (2006.01)
  *F16F 7/108* (2006.01)

(52) U.S. Cl.
  CPC .......... *F16F 15/1442* (2013.01); *F16F 7/104* (2013.01); *F16F 7/108* (2013.01); *F16F 15/1435* (2013.01); *F16F 2222/08* (2013.01); *F16F 2232/02* (2013.01)

(58) Field of Classification Search
  CPC .... F16F 15/1442; F16F 15/1435; F16F 7/108; F16F 7/104
  See application file for complete search history.

(56) References Cited

U.S. PATENT DOCUMENTS

| | | | |
|---|---|---|---|
| 1,830,600 A | 11/1931 | Albert | |
| 4,207,957 A * | 6/1980 | Sivers | B60K 17/22 180/380 |
| 8,342,058 B2 * | 1/2013 | Christenson | F16F 7/108 74/572.2 |

(Continued)

FOREIGN PATENT DOCUMENTS

JP  2004156674  6/2004

OTHER PUBLICATIONS

EP, European Supplemental Search Report; European Application No. 17185439.1 (dated Feb. 13, 2018).

(Continued)

*Primary Examiner* — Luis A Gonzalez
(74) *Attorney, Agent, or Firm* — FisherBroyles, LLP; Susan M. Oiler (57) ABSTRACT

Radial vibration dampers have an inertia member defining an annular channel having (i) a radially facing, open face; (ii) a bottom surface; and (iii) interior, opposing surfaces. The interior, opposing surfaces are each angled outward away from a central transverse plane through the inertia member at an angle in a range from zero degrees to at most 45 degrees. A spring damper member is seated in the annular channel to a selected depth that defines a damper gap between a radial inner surface of the spring damper member and the bottom surface of the annular channel and defines a clearance gap between the shaft and the inertia member. A tuning ratio of the clearance gap to the selected depth is in a range of about 1:1.5 to about 1:0.5.

18 Claims, 5 Drawing Sheets
(2 of 5 Drawing Sheet(s) Filed in Color)

(56) References Cited

U.S. PATENT DOCUMENTS

| | | |
|---|---|---|
| 8,973,463 B2 | 3/2015 | Manzoor |
| 9,410,597 B2 | 8/2016 | Manzoor |
| 2014/0315648 A1* | 10/2014 | Manzoor ............. F16F 15/1201 |
| | | 464/180 |
| 2015/0252885 A1* | 9/2015 | Manzoor ................ F16H 55/36 |
| | | 474/148 |

OTHER PUBLICATIONS

EP, First Office Action, European Application No. 17185439.1 (dated Mar. 20, 2019).
Acoustical Engineering: Noise Control and Vibration Abatement; "What is Vibration Modal and Fatigue Analysis?"; HGC Engineering; Howe Gastmeier Chapnik Limited (earliest access date according to Wayback Machine Internet Archive Engine Aug. 12, 2012).
Computer Generated English Translation of Foreign Patent JP 2004156674 A.

* cited by examiner

Maximum Principal Elastic Strain    FIG. 5

FIG. 6

Mode 1: Radial
(340 Hz)

FIG. 7

Mode 2: Axial
(360 Hz)

FIG. 8

Mode 3: Torsion
(410 Hz)

FIG. 9

Mode 4: Conical
(615 Hz)

FIG. 10

RADIAL VIBRATION DAMPERS HAVING A TUNING RATIO AND A TUNING ANGLE

RELATED APPLICATIONS

This application claims the benefit of U.S. Provisional Application 62/373,074, filed Aug. 10, 2016, the entirety of which is incorporated herein by reference.

TECHNICAL FIELD

The present invention relates to radial vibration dampers, more particularly, to radial vibration dampers press-fittable to rotatable shafts (inside or outside) with an elastomeric member in direct contact with the shaft such as, but not limited to, drive-shafts, prop-shafts, and half-shafts, where the radial vibration damper has a tuning ratio and a tuning angle.

BACKGROUND

Radial vibration dampers are used to reduce radial vibrations in rotating shaft systems, and can be mounted internally or externally relative to the shaft with the elastomeric member in direct contact with the shaft. The most desirable radial vibration damper for inside a hollow shaft is one that has a first mode of vibration, as indicated by finite element analysis (FEA), which is sufficiently decoupled from a second mode of vibration. The device must also be easy to insert into the shaft at a designated axial location, and hold its position throughout its operating life. Such a radial vibration damper is typically expensive because the construction is complex and it is unrealistic to invest in expensive injection molds for smaller production runs.

An additional problem encountered while assembling these devices is that the inner diameter of the hollow shaft that receives the radial vibration dampers generally has loose tolerances that do not allow a robust metal-to-metal press-fit. A very effective radial vibration damper of this type is disclosed in Applicants U.S. Pat. No. 9,410,597, issued Aug. 9, 2016. However, the construction comprises a multi-part inertia member with a specially shaped elastomeric member. This complexity of design is required to obtain a proper radial response, i.e., the first mode of vibration being radial with appropriate modal separation between the first mode and the second mode, but it also adds to the overall cost of the damper.

To satisfy cost demands of customers, an internal tube damper that is a torsional vibration damper having a radial mode has been tried, but has proven to be a sub-par solution. The problem with using such a torsional vibration damper is that the axial mode had a lower frequency than the radial mode, as determined by FEA. This is undesirable because the damper could shift location inside the shaft. If the torsional vibration damper moves to a nodal location in the shaft, the damper becomes ineffective.

There is a need for a vibration damper mountable inside or outside of a shaft with the elastomeric member in direct contact with the shaft having the more cost-effective construction similar to the torsional vibration damper discussed above, but being constructed to actually be a radial vibration damper with adequate modal separation between the first mode and the second mode.

SUMMARY

In one aspect, radial vibration dampers are described that have an inertia member defining an annular channel having a radially facing, open face, a bottom surface, and interior, opposing surfaces and a spring damper member seated in the annular channel. The interior, opposing surfaces of the annular channel are each angled generally outward away from a central transverse plane through the inertia member at an angle in a range from zero degrees to at most 45 degrees, at most 40 degrees, or at most 35 degrees. The spring damper member has a channel portion, the portion seated in the annular channel, seated in the annular channel to a selected depth that defines a damper gap between a radial inner surface of the spring damper member and the bottom surface of the annular channel. The channel portion also has opposing angled axial surfaces that mate with the interior, opposing surfaces of the annular channel. The spring damper member has a shaft-engaging portion protruding from the radially facing, open face, which protrudes therefrom a sufficient distance that, once the shaft-engaging portion is compressed against a shaft, the spring damper member defines a clearance gap between the shaft and the inertia member. The radial vibration dampers have a tuning ratio, the ratio of the clearance gap to the selected depth, in a range of about 1:1.5 to 1:0.5 and finite element analysis modeling demonstrates that the radial vibration damper has a first mode of vibration that is radial in shape.

In all embodiments, the inertia member may be a monolithic body, the selected depth may be defined by an annular shoulder in each of the interior, opposing surfaces of the annular channel, the damper gap has a radial distance of about 1 mm to about 25 mm, and finite element analysis modeling demonstrates that the radial vibration damper has a second mode of vibration with a frequency that is at least 20 Hertz higher than the first mode of vibration. In all embodiments, the second mode of vibration may be axial in shape.

In one embodiment, the spring damper member has an annular stiffening rib extending axially along at least a central portion of the radial inner face. The stiffening rib may be made of the same material(s) as the channel portion, but the stiffening rib has a higher modulus than the channel portion. In another embodiment, the radial inner surface of the spring damper member is wedge-shaped with a generally central apex in contact with the bottom surface of the annular channel.

In all embodiments, the spring damper member may be an elastomeric material, a hyperfoam material, a nylon material, or combinations thereof, and the spring damper member may be an endless band.

Depending upon the orientation of the inertia member and the spring damper member, the radial vibration damper is press-fittable into a hollow shaft with the shaft-engaging portion of the spring damper member compressed against an inner surface of the hollow shaft or over a shaft with the shaft-engaging portion of the spring damper member compressed against an exterior surface of the shaft.

In another aspect, systems are disclosed herein of a shaft having press-fit thereto a radial vibration damper according to claim 1. In one embodiment, the radial vibration damper is press-fit inside the shaft, and in another embodiment, the radial vibration damper is press-fit about the exterior of the shaft.

BRIEF DESCRIPTION OF DRAWINGS

The patent or application file contains at least one drawing executed in color. Copies of this patent or patent application publication with color drawing(s) will be provided by the Office upon request and payment of the necessary fee.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 1:
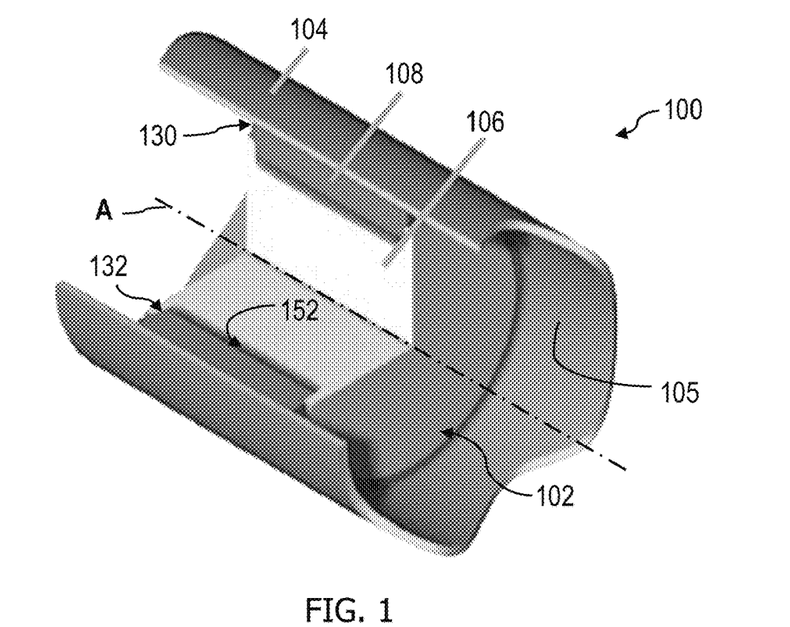
FIG. 1 is a side perspective view, with a portion cut away, of a radial vibration damper seated within a hollow shaft.
Figure 2:
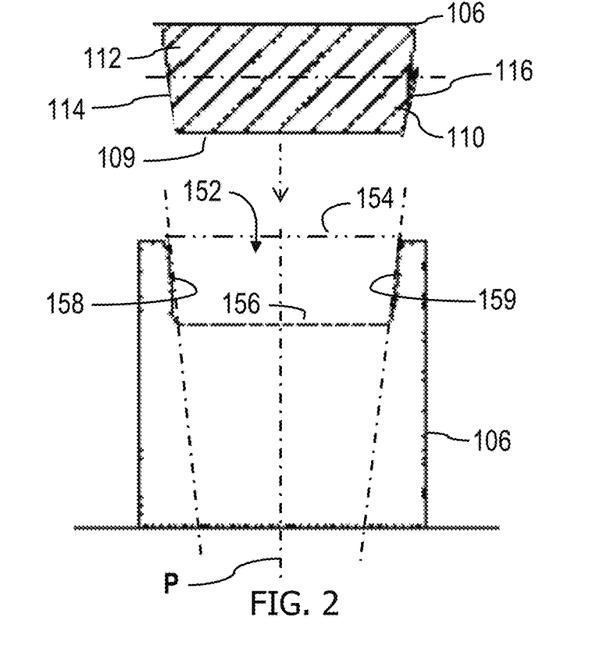
FIG. 2 is an unassembled, partial longitudinal cross-section view of the radial vibration damper of FIG. 1.

Referring to FIGS. 1-2, an example of one embodiment of a system 100 that includes a hollow shaft 104 with a radial vibration damper 102 press fit therein is shown. A spring damper member 108 is in direct contact with the shaft 104, held thereagainst by an inertia member, which together use volumetric incompressibility of the spring damper member 108 to ensure adequate hydrostatic pressure is exerted against the shaft via an axis-symmetric compression from being press-fit against the shaft. The shaft 104 may be any shaft intended to rotate during use, such as a drive shaft, prop-shaft, half-shafts, or the like used in automotive applications, but is not limited thereto.

Referring to FIGS. 1-3D, the radial vibration damper 102 includes a monolithic inertia member 106 defining a central longitudinal axis A and at least one annular channel 152 having a radially facing open side 154, which faces radially outward towards an inner surface 105 of the hollow shaft 104, a bottom face 156, and interior, opposing sides 158, 159. The interior, opposing sides 158, 159 are each angled generally outward away from a central transverse plane P through the inertia member 106 in a range from 0 degrees to at most 45 degrees. In one embodiment, the angle of the interior, opposing surfaces are each in a range from zero to at most 40 degrees. In another embodiment, the angle of the interior, opposing surfaces are each in a range from zero to at most 35 degrees. The radial vibration dampers disclosed herein use a combination of a tuning angle and a tuning gap to ensure that the first mode of vibration, as determined by FEA, is radial in shape and that there is adequate modal decoupling between the first mode of vibration and the second mode of vibration.

Figures 3A, 3B:
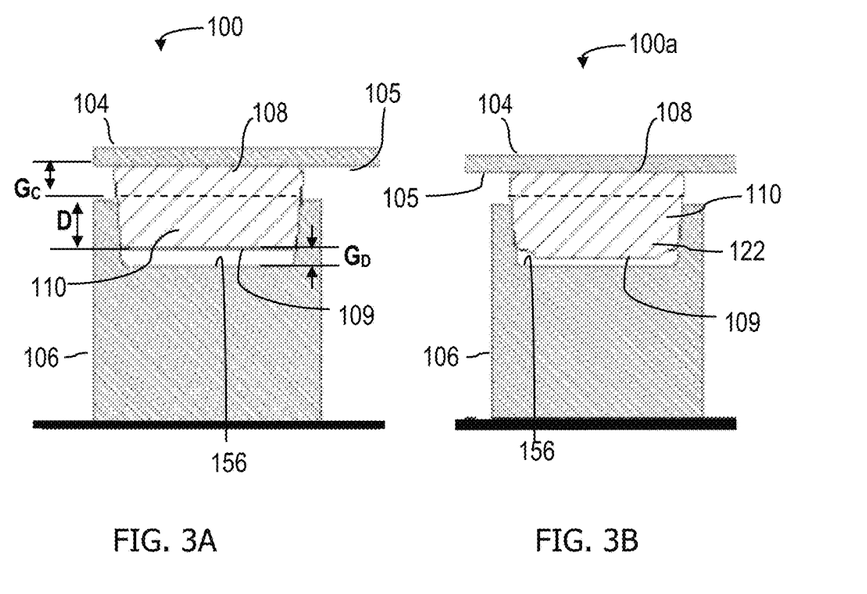
FIGS. 3A-3D are longitudinal cross-sections (half-portions) of variations of embodiments of the radial vibration damper of FIG. 1.
Figure 3C:
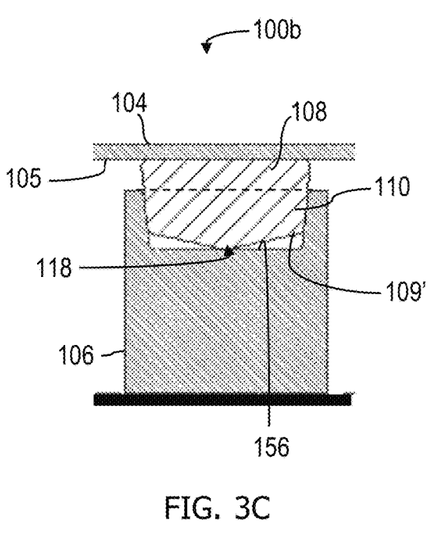

With reference to FIGS. 2 and 3A, the spring damper member 108 has a channel portion 110 seated in the annular channel 152 to a selected depth D that defines a damper gap $G_D$ between the radial inner surface 109 of the spring damper member 108 and the bottom face 156 of the annular channel 152. The damper gap $G_D$ has a radial distance of about 1 mm to about 25 mm, where as long as the gap is present, a particular radial distance is not required. The channel portion 110 of the spring damper member 108 has opposing angled axial faces 114, 116 (as best seen in FIG. 2) that mate with the interior, opposing faces 158, 159 of the annual channel 152, which together form a tuning angle and a tuning angle joint 132 (FIG. 1) for changing the frequency of the modes of vibration. The mating angles of the sides of the spring damper member 108 and the annular channel 152 have a cone-in-cone construction, which advantageously renders the spring damper member 108 self-centering within the annular chamber 152.

Figure 3D:
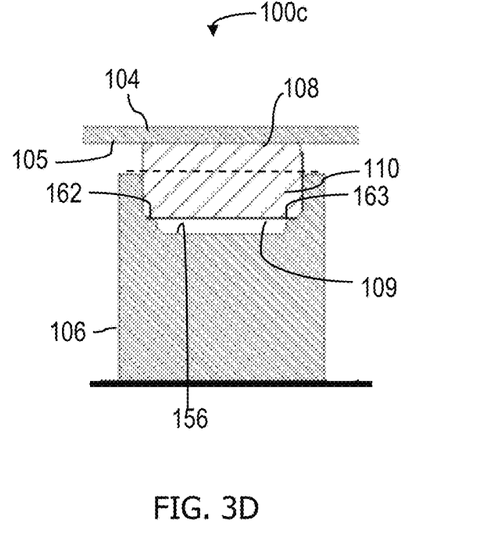

As illustrated in FIG. 3D, when the mating angles of the sides of the spring damper member 108 and the annular channel 152 are in the range from 0 degrees to about 10 degrees measured from a central transverse plane through the inertia member 106 (as shown in FIG. 2), especially closer to a 0 degree angle, the radial vibration damper should preferably include annular shoulders 162, 163 in each of the interior, opposing surfaces 158, 159 of the annular channel 152. The embodiment in FIG. 4 also includes annular shoulder 162, 163. The annular shoulders 162, 163 act as stops that define the depth D to which the spring damper member 108 is insertable in the annular channel 152.

Referring again to FIGS. 2 and 3A, the spring damper member 108 may be an endless band or a strip seated in the annular channel to form an annular ring, which for description purposes as illustrated by the dashed line in FIG. 2, can be described as having two portions: a shaft-engaging portion 112 protruding from the radially facing, open face 154 a sufficient distance that, once the shaft-engaging portion 112 is compressed against a shaft 104, the spring damper member 108 defines a clearance gap $G_C$ between the shaft 104 and the inertia member 106 (i.e., at least part of the shaft-engaging portion 112 is outside of the annular channel 152), and a channel portion 110 seated within the annular channel 152. To define the clearance gap $G_C$, the outer diameter of the inertia member 106 is less than the inner diameter of the hollow shaft 104, such that, when the radial vibration damper 102 is press-fit into the hollow shaft 104, which compresses the shaft-engaging portion 112 against the inner surface 105 of the shaft 104 and allows some amount of movement of the inertia member 106 relative to the rotation of the hollow shaft 104.

The radial vibration damper 102 is tuned to have a first mode according to finite element analysis modeling that is radial, even though it may appear form its construction to be expected to have a first mode that is torsional. This tuning is accomplished by implementation of a Tuning Ratio ($T_r$) of $G_C$:D, with the presence of a $G_D$, after assembly, that is about 1:1.5 to about 1:0.5. In one embodiment, the Tuning Ratio is about 1:1. "About" as used herein means +/−5% of a numerical value.

As shown in the embodiment 100a in FIG. 3B, the spring damper member 108 may include an annular stiffening rib 122 extending axially along at least a central portion of the radial inner face. In the embodiment 100c shown in FIG. 3C, the radial inner surface 109' of the spring damper member 108 is wedge-shaped with a generally central apex 118 (e.g., central support) in contact with the bottom surface 156 of the annular channel 152. The stiffness rib 122 or the wedge-shaped central support 118 enables the shaft-engaging portion 112 to be compressed against the inner surface 105 of a hollow shaft 104 (FIG. 1) by enhancing the hydrostatic pressure defining the joint 130 between the shaft-engaging portion 112 and the inner surface 105 of the hollow shaft 104. The shaft-engaging portion 112 has a coefficient of friction, which, combined, with the hydrostatic pressure holds the radial vibration damper 102 in place within the hollow shaft 104 without axial movement ("walking the shaft").

Figure 5:
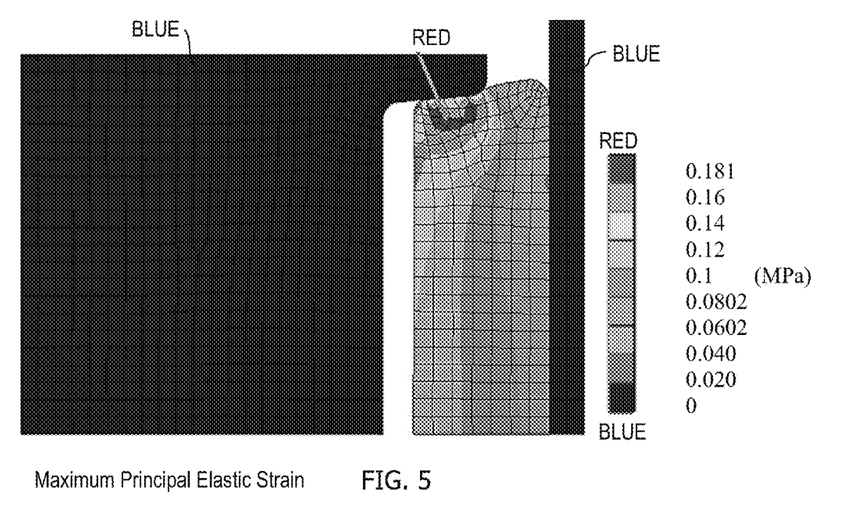
FIG. 5 is a finite element analysis plot of the maximum principle elastic strain of the spring damper member at the interface with the inertia member and with the shaft.

FIG. 5 is a static structural maximum principal elastic strain analysis of the system 100 in an assembled state. The maximum principle strain (red color) is a generally small area internal to the spring damper member proximate the tuning angle joint 132 (FIG. 1). The maximum principle strain is 0.181 MPa, which is below the threshold typically found acceptable by a manufacturer of radial vibration dampers. At the tuning angle joint 132 the material of the spring damper member 108 is in a complex mode of stress and sheer along the angled interior surface of the channel of the inertia member, as well as being in compression.

Figure 6:
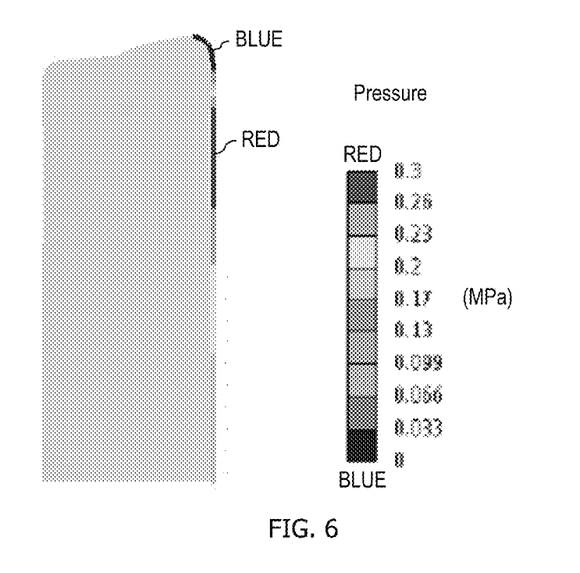
FIG. 6 is a finite element analysis plot of the contact pressure at the interface of the spring damper member and the shaft.

FIG. 6 is a static structural pressure analysis at the joint 130 (FIG. 1) between the shaft 104 and the spring damper member 108. The contact pressure value from FIG. 6 is used to calculate the push-off force, which is preferably at least 150 lbf. For a spring damper member 108 having a radius of 30.5 mm, a width (w) of 40 mm, a coefficient of friction (μ) of 0.4, a contact pressure average ($cp_{av}$) of 0.22 MPa, the push off force is 151.6477 lbf, using the equations:

$$area = 2\pi \cdot rad \cdot w; react = cp_{av} \cdot area; \text{ and push off force} = react \cdot \mu.$$

The contact pressure average includes not only a value resulting from the insertion of the spring damper member 108 in the annular channel 152 and within the shaft 104, but also includes a factor attributable to a volume change from soaking the spring damper member 108 in oil for ease of insertion into the annular channel. The spring damper member 108 post-assembly absorbs some of the oil and experiences an increase in volume, which while small in magnitude, the fact that the elastomer is axis-symmetrically constrained within the annular channel causes a corresponding increase in contact pressure that is significant. As noted, this is included in the $cp_{av}$ value.

Figure 7:
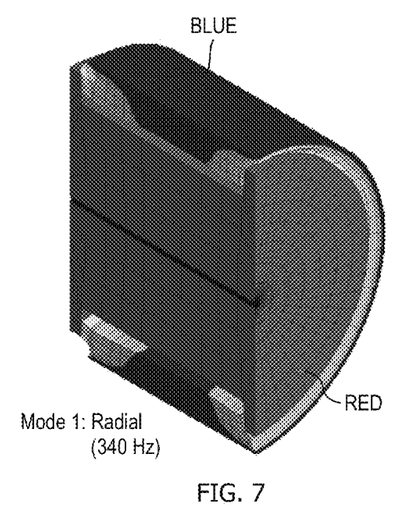
FIGS. 7-10 are the first four Modal responses, in color, of the radial vibration damper of FIG. 1 as modeled using finite element analysis modeling.
Figure 8:
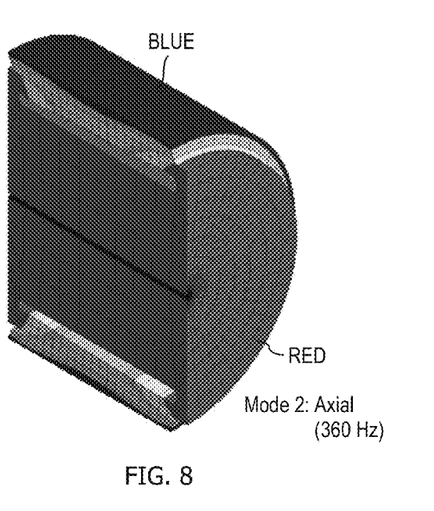
Figure 9:
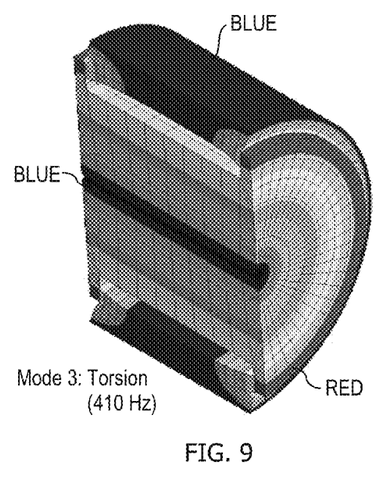
Figure 10:
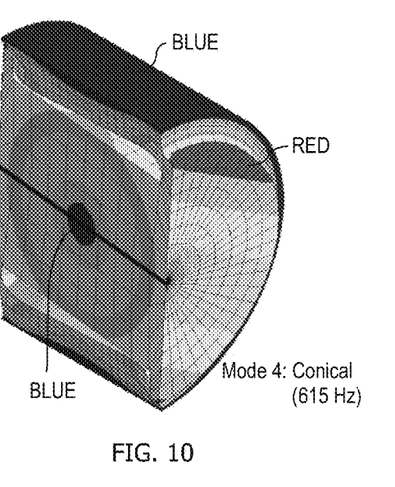

As seen in FIGS. 7-8, the results of finite element analysis (FEA) modeling, a normal modes analysis (elastomer flex modes only) demonstrate that the radial vibration damper 102 has a first mode of vibration that is radial in shape, hence making the damper a radial vibration damper. This was unexpected and surprising because the basic construction of the damper leads one of skill in the art to expect that the first mode would be torsional in shape based on a comparison to the torsional vibration dampers disclosed in Applicant's granted U.S. Pat. No. 8,973,463.

Still referring to FIGS. 7-10, the radial vibration damper 102 also has sufficient separation between the first mode and the second mode of vibration, which in the color FEA models is axial (known as modal decoupling). Preferred modal decoupling is present when the frequency of the second mode of vibration is at least about 20 Hertz higher than the first mode of vibration. The color scale in FIGS. 7-10 correlates color along the visible spectrum with the magnitude of the stress experienced at specific locations within the radial vibration damper 102, with red tones representing the largest magnitude values and blue to violet tones representing the smallest magnitude values. For the specific embodiment analyzed, the radial mode is at 340 Hertz, the axial mode is at 360 Hertz, the third mode is torsional in shape and is at 410 Hertz, the fourth mode is conical in shape and is at 615 Hertz. The radial vibration damper 102 may be tuned to have a modal decoupling of 20 Hz or greater (a generally accepted industrial standard) by changing various parameters of the radial vibration damper 102, which will be better understood after an explanation of the structure of the damper itself.

The spring damper member includes compressible material selected from one or more of an elastomeric material, a hyperfoam material, and a nylon. Each of these materials may be any such materials that are suitable to absorb and/or damp the vibrations generated by the shaft and able to withstand the general conditions experienced by the shaft such as temperature changes, road conditions, etc. The elastomeric material may be or include one or more of a styrene-butadiene rubber, a natural rubber, a nitrile butadiene rubber, an ethylene propylene diene rubber (EPDM), an ethylene acrylic elastomer, a hydrogenated nitrile butadiene rubber, and a polycholoroprene rubber. One example of an ethylene acrylic elastomer is VAMAC® ethylene acrylic elastomer from E. I. du Pont de Nemours and Company. The hyperfoam material may be or include one or more of micro cellular urethane, sponge, or the like. The nylon may be or include nylon 6, nylon 6/6, or the like. The spring damper member 108 may be a composite that optionally includes a plurality of fibers dispersed therein. The fibers may be continuous or fragmented (chopped) aramid fibers like the fibers sold under the name TECHNORA® fiber and/or carbon fibers, for example.

The spring damper member may be made by extrusion methods or molding methods, typically extrusion methods because it is more cost effective.

The inertia member 106 may be made from any material having a sufficient mass, usually a cast iron metal, and may be cast, spun, forged, machined, or molded using known or hereinafter developed techniques. The annular recess 152 in the inertia member 106 is preferably machines into the outer radial surface thereof, which defines the outer diameter thereof.

Figure 4:
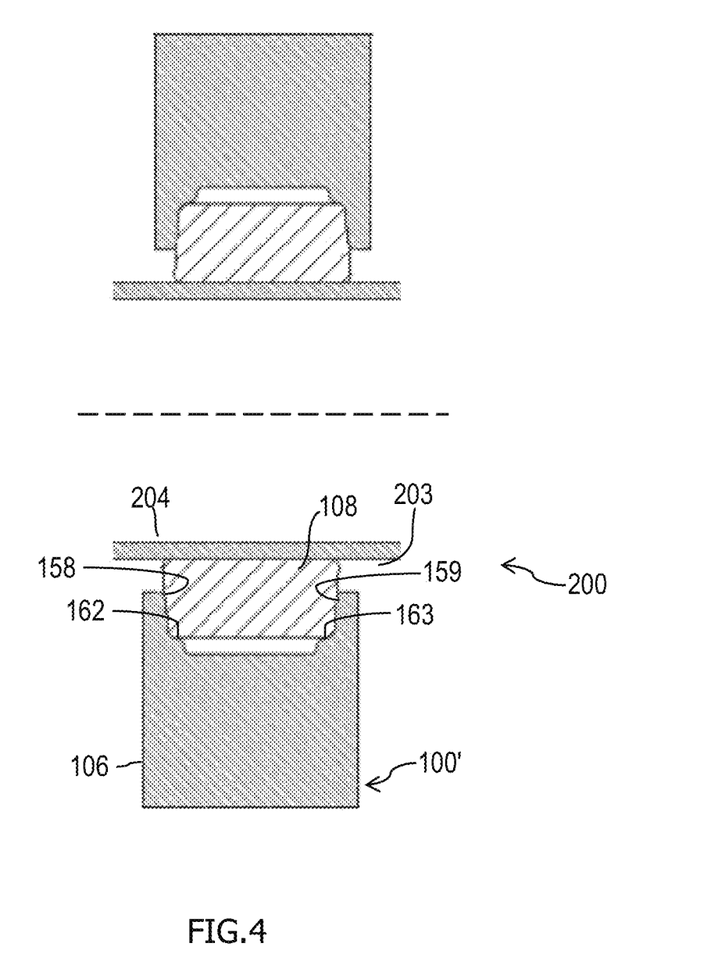
FIG. 4 is a longitudinal cross-section of a second embodiment for a radial vibration damper, which is press-fit on the exterior of a shaft.

Referring to FIG. 4, an example with a radial vibration damper 100' press-fit on the exterior 203 of a shaft 204 (i.e. disposed about the shaft) is shown. For this system 200, the shaft 204 may be either solid or hollow. Otherwise, the radial vibration damper 100' is constructed with like parts and the same or similar features to the radial vibration damper 100, discussed above. The radial vibration damper 100', being disposed on the exterior surface 203 of the shaft 204, provides easier access to the radial vibration damper 100' for tuning and service. In addition, the external radial vibration damper 100' allows for easy addition of more weight to the inertia member 106, as well as the same advantages pointed out above for the embodiments described with reference to FIGS. 1-3D.

The radial vibration damper 100 may be tuned by changing any one or more of the mass of the active member, the tuning angle, the tuning ratio, adding a stiffness rib or a central support, and the compressible nature of the spring damper member.

The radial vibration dampers disclosed herein have a first mode of vibration that is radial in character with adequate modal decoupling from subsequent vibration modes, in particular the axial mode, and is made with fewer parts by more cost-effective manufacturing methods such as machining the inertia member and extruding the spring damper member. As such, over-molding and mold-bonding processes for constructing the elastomeric parts can be avoided.

This results in reducing manufacturing costs and easier installation, among other benefits. Further, the radial vibration dampers satisfy all noise, vibration harshness requirements for use in an engine system or an automotive system.

Although the invention is shown and described with respect to certain embodiments, it is obvious that modifications will occur to those skilled in the art upon reading and understanding the specification, and the present invention includes all such modifications.

What is claimed is:

1. A radial vibration damper comprising:
   an inertia member defining an annular channel having a radially facing, open face, a bottom surface, and interior, opposing surfaces, wherein the interior, opposing surfaces are each angled generally outward away from a central transverse plane through the inertia member at an angle in a range from zero degrees to at most 45 degrees; and
   a spring damper member having a channel portion seated in the annular channel to a selected depth that defines a damper gap between a radial inner surface of the spring damper member and the bottom surface of the annular channel and having a shaft-engaging portion protruding from the radially facing, open face, wherein once the shaft-engaging portion is compressed against a shaft, the spring damper member defines a clearance gap between the shaft and the inertia member;
   wherein the channel portion of the spring damper member has opposing angled axial surfaces that mate with the interior, opposing surfaces of the annular channel;
   wherein a tuning ratio of the clearance gap to the selected depth is in a range of about 1:1.5 to about 1:0.5, and finite element analysis modeling demonstrates that the radial vibration damper has a first mode of vibration that is radial in shape.

2. The radial vibration damper of claim 1, wherein the inertia member is a monolithic body.

3. The radial vibration damper of claim 1, wherein the selected depth is defined by an annular shoulder in each of the interior, opposing surfaces of the annular channel.

4. The radial vibration damper of claim 1, wherein the damper gap has a radial distance of about 1 mm to about 25 mm.

5. The radial vibration damper of claim 1, wherein the spring damper member further comprises an annular stiffening rib extending axially along at least a central portion of the radial inner face.

6. The radial vibration damper of claim 5, wherein the stiffening rib comprises one or more of the same materials as the channel portion, and the stiffening rib has a higher modulus than the channel portion of the spring damper member.

7. The radial vibration damper of claim 1, wherein the spring damper member comprises one or more of an elastomeric material, a hyperfoam material, and a nylon.

8. The radial vibration damper of claim 1, wherein the spring damper member is an endless band.

9. The radial vibration damper of claim 1, wherein the radial inner surface of the spring damper member is wedge-shaped with a generally central apex in contact with the bottom surface of the annular channel.

10. The radial vibration damper of claim 1, wherein finite element analysis modeling demonstrates that the radial vibration damper has a second mode of vibration with a frequency that is at least 20 Hertz higher than the first mode of vibration.

11. The radial vibration damper of claim 10, wherein the second mode of vibration is axial in shape.

12. The radial vibration damper of claim 1, wherein the radial vibration damper is press-fittable into a hollow shaft with the shaft-engaging portion of the spring damper member compressed against an inner surface of the hollow shaft.

13. The radial vibration damper of claim 1, wherein the radial vibration damper is press-fittable over a shaft with the shaft-engaging portion of the spring damper member compressed against an exterior surface of the shaft.

14. The radial vibration damper of claim 1, wherein the angle of the interior, opposing surfaces are each in a range from zero to at most 40 degrees.

15. The radial vibration damper of claim 1, wherein the angle of the interior, opposing surfaces are each in a range from zero to at most 35 degrees.

16. A system comprising a shaft having press-fit thereto a radial vibration damper according to claim 1.

17. The system of claim 16, wherein the radial vibration damper is press-fit inside the shaft.

18. The system of claim 16, wherein the radial vibration damper is press-fit about the exterior of the shaft.

* * * * *